United States Patent [19]

Ronco

[11] Patent Number: 4,719,293
[45] Date of Patent: Jan. 12, 1988

[54] (2,5-DIISOPROPOXYCARBONYLBENZENE-AZO-2-HYDROXY-3-CARBAMOYL NAPHTHALENE) PIGMENT

[75] Inventor: Karl Ronco, Riehen, Switzerland
[73] Assignee: Ciba-Geigy Corporation, Ardsley, N.Y.
[21] Appl. No.: 661,876
[22] Filed: Oct. 17, 1984

Related U.S. Application Data

[63] Continuation of Ser. No. 259,321, Apr. 30, 1981, abandoned.

[30] Foreign Application Priority Data

May 7, 1980 [CH] Switzerland ............ 3552/80

[51] Int. Cl.$^4$ .............. C09B 33/048; C09B 35/033; C09B 35/30; C09B 31/075
[52] U.S. Cl. ..................... 534/828; 534/575; 534/887; 106/288 Q; 106/308 Q; 106/23
[58] Field of Search ......................... 534/828

[56] References Cited

U.S. PATENT DOCUMENTS 3,562,249 2/1971 Schnabel et al. ............ 260/184

FOREIGN PATENT DOCUMENTS 1644111 10/1970 Fed. Rep. of Germany ...... 260/174
1133400 11/1968 United Kingdom ............... 260/174

Primary Examiner—Floyd D. Higel
Attorney, Agent, or Firm—Luther A. R. Hall

[57] ABSTRACT

The invention relates to disazo pigments of the formula wherein R is an ethyl, propyl or isopropyl radical. These pigments colour plastics, especially rigid PVC, in brown shades of excellent fastness properties.

1 Claim, No Drawings

(2,5-DIISOPROPOXYCARBONYLBENZENE-AZO-2-HYDROXY-3-CARBAMOYL NAPHTHALENE) PIGMENT

This is a continuation of application Ser. No. 259,321, filed Apr. 30, 1981, now abandoned.

The present invention relates to disazo pigments of the formula

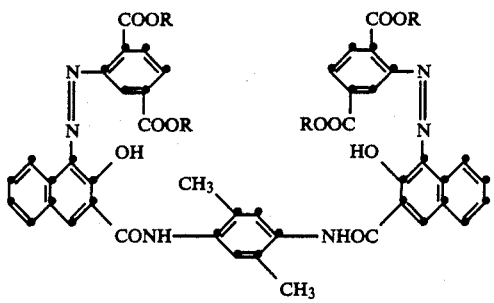

wherein R is an ethyl, propyl or isopropyl radical.

These compounds are obtained by condensing an acid chloride of the formula

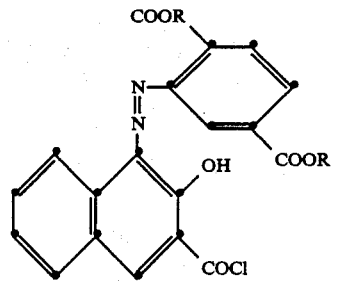

wherein R has the above meaning, with 2,5-dimethyl-1,4-phenylenediamine, in the molar ratio 2:1.

The acid chlorides of the formula (II) are obtained by coupling a diazotised diethyl, dipropyl or, in particular, diisopropyl aminoterephthalate with 2,3-hydroxynaphthoic acid and treating the resultant azo dyestuff carboxylic acid with an acid chlorinating agent such as phosphorus trichloride, phosphoroxy chloride or, preferably, thionyl chloride. The treatment with the acid chlorinating agent is advantageously carried out in an inert organic solvent such as dimethyl formamide or a chlorobenzene, e.g. mono- or dichlorobenzene, toluene, xylene or nitrobenzene, or higher alkylated aromatic hydrocarbons, optionally with the addition of dimethyl formamide in the case of the six last mentioned solvents. When preparing the carboxylic acid chloride it is advantageous first to dry the azo compound obtained in aqueous medium or to boil it in an organic solvent in order to remove water as an azeotrope. If desired, this azeotropic drying can be carried out directly before the treatment with the acid halogenating agent.

The condensation of the carboxylic acid chloride and the 2,5-dimethyl-1,4-phenylenediamine is advantageously carried out in anhydrous medium and in a temperature range within the boiling range of normal organic solvents such as toluene, monochlorobenzene, dichlorobenzene, trichlorobenzene, nitrobenzene, higher alkylated aromatic hydrocarbons and the like. To hasten the reaction it is advisable to use an acid acceptor such as anhydrous sodium acetate, pyridine or N,N-diethylaniline. The pigments are obtained in very good yield and purity. It is advisable first to separate the acid chlorides from the carboxylic acids. Owing to their insolubility the pigments can be isolated from the reaction mixture by filtration.

The pigments of the formula (I) are also obtained by coupling diazotised diethyl, dipropyl or diisopropyl aminoterephthalate with 2,5-dimethyl-1,4-bis-(2'-hydroxy-3'-naphthoylamino)benzene in the molar ratio of 2:1.

The coupling is preferably carried out by suspending the amine to be diazotised with the coupling component, in the molar ratio 2:1, in an organic solvent, and treating the coupling mixture with a diazotising agent, in particular an ester of nitrous acid, such as methyl, ethyl, butyl, or amyl nitrite.

In dispersion, the pigments of the present invention are suitable for pigmenting compounds of high molecular weight, for example cellulose ethers and esters such as ethyl cellulose, acetyl cellulose, nitrocellulose, polyamides, polyurethanes or polyesters, natural resins or synthetic resins, for example aminoplasts, in particular urea/formaldehyde and melamine/formaldehyde resins, alkyd resins, phenolic plastics, polycarbonates, polyolefins such as polystyrene, polyvinyl chloride, polyethylene, polypropylene, polyacrylonitrile, polyacrylates, thermoplastic or curable acrylic resins, rubber, casein, silicone and silicone resins, singly or in mixtures. The specified high molecular compounds can be in the form of plastics, melts or of spinning solutions, lacquers, or printing inks. Depending on the end use, it is advantageous to use the pigments as toners or in the form of preparations.

The brown colorations obtained, e.g. in plastics, filaments and lacquers, have very pronounced colour strength, good dispersibility, good fastness to overspraying, migration heat and light and good resistance to weathering as well as good gloss, good IR reflectance and, in particular, good resistance to weathering in rigid PVC, also in fine preparation form. Compared with the commercially available brown pigments, the pigments of this invention have better lightfastness and resistance to weathering.

The invention is illustrated by the following Examples, in which parts and percentages are by weight unless otherwise indicated.

EXAMPLE 1

46.4 parts of the dyestuff carboxylic acid obtained by coupling diazotised diisopropyl aminoterephthalate with 2,3-hydroxynaphthoic acid are suspended in 100 parts of o-dichlorobenzene. Then 12 parts of thionyl chloride and 0.5 part of dimethyl formamide are added and the mixture is heated for 2 hours to 110° C. The suspension is cooled and the precipitated pure acid chloride is isolated by filtration, washed with petroleum ether, and dried. 48.2 parts of this azocarboxylic acid chloride and 6.8 parts of 2,5-dimethyl-1,4-phenylenediamine are stirred in 600 parts of o-dichlorobenzene and the mixture is heated to 140°–145° C. The reaction mass is stirred for 16 hours at this temperature, then the suspension is filtered hot and the product is washed in succession with warm o-dichlorobenzene, methanol and water, and dried, affording 49.5 parts of the brown, fine-crystalline pigment of the formula I (R=isopropyl), which can be readily dispersed.

EXAMPLE 2

46.6 parts of the dyestuff carboxylic acid obtained by coupling diazotised diisopropyl aminoterephthalate with 2,3-hydroxynaphthoic acid are stirred in 132 parts of higher alkylated aromatic hydrocarbons and the mixture is heated to 70°-80° C. Then, 0.2 part of pyridine is added, followed by the dropwise addition over 30 minutes of 16.3 parts of thionyl chloride. The reaction mixture is then stirred for 90 minutes at 100°-110° C., then cooled to 10° C. The precipitated crystals of the acid chloride are isolated by filtration, washed once with higher alkylated aromatic hydrocarbons and then with petroleum ether, and dried at 70°-80° C. 24.2 parts of the azocarboxylic acid chloride so obtained are stirred in 270 parts of higher alkylated aromatic hydrocarbons. A solution of 3.4 parts of 2,5-dimethyl-1,4-phenylenediamine in 175 parts of higher alkylated aromatic hydrocarbons is then poured into this suspension and the mixture is heated to 140° C. and stirred for 16 hours at 140°-145° C. The precipitated crystals of the pigment are isolated by filtration at 100° C., washed with higher alkylated aromatic hydrocarbons and then with methanol and water. The pigment is dried for 16 hours at 80°-90° C., affording 24.3 parts of the brown, fine-crystalline pigment of the formula I (R=isopropanol), which can be readily dispersed.

EXAMPLES 3 AND 4

The procedure of Examples 1 and 2 is repeated, using diethyl aminoterephthalate or dipropyl aminoterephthalate as diazo base. In each case a brown pigment of the formula I is also obtained.

EXAMPLE 5

68 g of polyvinyl chloride powder (suspension polymer), 33 g of dioctyl phthalate, 2 g of dibutyl tin dilaurate, 0.3 g of a phosphate stabiliser and 0.7 g of the pigment of Example 1 are mixed and the mixture is processed for 15 minutes on mixing rolls at 160° C. A sheet having a thickness of 0.4 mm is produced on a calender. The sheet is coloured in a brown shade which is heat-resistant and fast to migration and light.

EXAMPLE 6

0.2 g of the pigment obtained in Example 1, 1 g of titanium dioxide (rutile) and 100 g of LD polyethylene granules are mixed in a drum and the mixture is then processed on mixer rolls at 130° C. The plastic mass is then pressed hot to sheets or moulded in an extruder. The sheets have a fine brown shade of good lightfastness.

EXAMPLE 7

0.1 g of the pigment obtained in Example 1, 0.5 g of titanium dioxide (rutile) and 100 g of polypropylene granules are mixed in a drum and the mixture is subsequently processed on mixer rolls at 190° C. until a homogeneously coloured mixture is obtained. The plastic mass is pressed to sheets of 1 mm thickness. The sheets are coloured in a fine brown shade of good lightfastness.

EXAMPLE 8

100 g of stabilised polyvinyl chloride are mixed with 1 g of a preparation obtained by salt kneading 0.5 g of pigment with 0.5 g of a copolymer of 85% of polyvinyl chloride and 15% of polyvinyl acetate and the mixture is rolled for 6 minutes at 190° C. The plastic mass is then agitated by hand until a good dispersion of the pigment is attained. The mass is then cooled again under pressure in the mould at 190°-200° C. The so obtained brown sheets have excellent resistance to weathering.

Brightened weather-resistant brown shades can be obtained in the same manner in rigid PVC by adding titanium dioxide to the batch while keeping the same amount of coloured pigment or reducing it.

EXAMPLE 9

10 g of tatanium dioxide and 2 g of the pigment obtained in Example 1 are ground for 48 hours in a ball mill with 88 g of a mixture of 26.4 g of coconut alkyd resin, 24 g of melamine/formaldehyde resin (50% solids content), 8.8 g of ethylene glycol monomethyl ether and 28.8 g of xylene. The resultant lacquer is sprayed onto an aluminium sheet, predried for 30 minutes at room temperature, and then stoved for 30 minutes at 120° C. A brown finish of very good fastness to overspraying and light and very good resistance to weathering is obtained.

EXAMPLE 10

4 parts of the finely dispersed pigment of Example 1 are stirred in 20 parts of solvent of the following composition: 50 parts of Solvesso 150 (mixture of aromatic hydrocarbons), 15 parts of butylacetate, 5 parts of Exkin II (ketoxime-based levelling agent), 25 parts of methyl isobutyl ketone, 5 parts of silicone oil (1% in Solvesso 150). After complete dispersion has been attained (in about 15-60 minutes, depending on the type of stirrer), the binders are added, namely 48.3 parts of Baycryl L 530 (acrylic resin; 51% in xylene/butanol 3:1) and 23.7 parts of Maprenal TTX (melamine resin; 55% in butanol).

The batch is briefly homogenised and the resultant lacquer is then applied by conventional methods, such as spraying or dipping) or—particularly for the continuous coating of sheet metal—by the coil-coating method, and stoved (30 minutes at 130° C.). The brown finishes obtained are distinguished by very good levelness, high gloss and excellent dispersion of the pigment, as well as by excellent resistance to weathering.

What is claimed is:
1. The compound of the formula

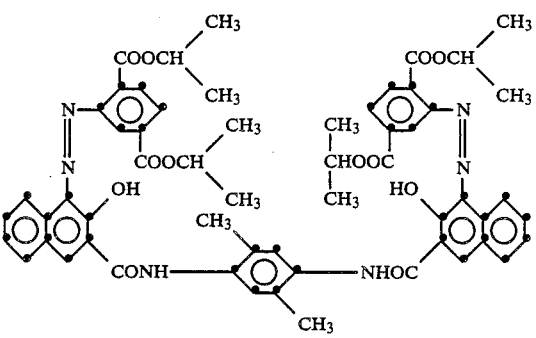

* * * * *